US007264219B2

(12) United States Patent
Kicher et al.

(10) Patent No.: US 7,264,219 B2
(45) Date of Patent: Sep. 4, 2007

(54) BREAKAWAY BANNER SUPPORT ASSEMBLY

(76) Inventors: Paul T. Kicher, 1916 Ridgehurst Dr., Wickliffe, OH (US) 44092; Thomas P. Kicher, 2920 Canterbury Ct., Willoughby Hills, OH (US) 44092

( * ) Notice: Subject to any disclaimer, the term of this patent is extended or adjusted under 35 U.S.C. 154(b) by 0 days.

(21) Appl. No.: 10/829,927

(22) Filed: Apr. 22, 2004

(65) Prior Publication Data

US 2005/0000130 A1 Jan. 6, 2005

Related U.S. Application Data

(60) Provisional application No. 60/466,325, filed on Apr. 29, 2003.

(51) Int. Cl.
*F16M 13/00* (2006.01)
*E05D 7/00* (2006.01)

(52) U.S. Cl. .................. 248/548; 248/289.11; 16/221; 40/606.15

(58) Field of Classification Search ................ 248/548, 248/900, 549, 289.11; 16/222, 221, 228, 16/250, 286, 284; 403/2; 40/606.15, 607.13
See application file for complete search history.

(56) References Cited

U.S. PATENT DOCUMENTS 2,098,921 A * 11/1937 Mandaville ................. 351/113
3,644,023 A * 2/1972 Villani ........................ 351/113
3,691,788 A 9/1972 Mazziotti
3,837,735 A * 9/1974 Guillet ....................... 351/113
3,957,241 A 5/1976 Morris et al.
3,957,360 A * 5/1976 Villani ........................ 351/113
4,477,199 A 10/1984 Manzoni
4,492,488 A 1/1985 Warshawsky
4,856,141 A * 8/1989 Sassenberg .................. 16/250
5,073,417 A 12/1991 Bowerman
5,320,322 A 6/1994 Williams
5,374,024 A 12/1994 Williams
5,388,794 A 2/1995 Wolff
5,540,181 A 7/1996 Pearce
5,558,455 A 9/1996 Emery
5,815,899 A * 10/1998 Chao ............................. 29/20
6,192,611 B1 * 2/2001 Molla .......................... 40/604
6,393,664 B1 5/2002 Habegger et al.
6,565,052 B1 * 5/2003 Doublet ................... 248/218.4
6,721,991 B2 * 4/2004 Dioguardi .................... 16/228

* cited by examiner

*Primary Examiner*—Anita M. King
(74) *Attorney, Agent, or Firm*—McDonald Hopkins LLC; Robert H. Earp, III; David J. Smith

(57) ABSTRACT

A breakaway banner support assembly for mounting to a vertical support structure having at least one mounting member connected to a support structure, a support rod extending along a generally horizontal plane for supporting a flexible banner, and a breakaway and return hinge interconnecting the support rod and said mounting member, said rod being pivotally movable along said generally horizontal plane between a display position and a breakaway position, said rod pivoting to a breakaway position in response to a force acting thereon so as to deflect said force and pivotally returning to said display position when said force dissipates.

23 Claims, 3 Drawing Sheets

BREAKAWAY BANNER SUPPORT ASSEMBLY

CROSS-REFERENCE TO RELATED APPLICATIONS

This application claims priority to U.S. Provisional Patent Application No. 60/466,325 filed on Apr. 29, 2003.

BACKGROUND

The present invention is broadly directed to a breakaway support assembly, and more particularly, to a breakaway banner support assembly having a breakaway and return hinge to pivotally deflect any force acting on the banner so as not to transfer the force to the support structure and reduce wear on the banner.

Banners, flags, and other indicia objects, hereafter referred to collectively as banners, are used to display numerous concepts, ideas, and advertisements. Municipalities, retail businesses, and other entities typically display such banners for advertising purposes, to attract shoppers, or simply for aesthetic decoration. Homeowners display banners for decorative or other purposes. In order to support such banners, it is common to provide support assemblies that can be affixed to an upright support structure, such as a light pole or building wall.

Due to common placement in outdoor settings, banners and their supporting assemblies are subject to intense lateral loading during high wind conditions. The banner itself can impose a sail-like force on the support assemblies and the support structures, e.g. light poles, leading to a "dumping" of large loads into the support structures that can cause damage or breakage. If the support assembly breaks due to the increased force exerted thereon by the banner, the support structure may be damaged. If the support structure is damaged, numerous dangerous conditions could result in personal injury or property damage (e.g. breaking or cracking of the light pole, exposed wiring, sharp or jagged edges, etc). As a consequence, it is known to provide banner support assemblies with a breakaway capacity for preventing the projecting banner rods from breaking or imparting a destructive force to the support structures.

There are several breakaway support assemblies that provide a one-time breakaway response to a high wind loading condition. Such structures prevent detrimental force loading onto the support structure by allowing a portion of the banner support assembly to break in response to a high wind loading condition. Thus, the portion of the banner support assembly that breaks in response to a force overload must be replaced and the banner support rods reinstalled.

There are also many currently installed support structures, including fiberglass or aluminum ornamental light poles, that were manufactured with a capacity that would be considered safe with the luminaries included in that particular installation. However, the addition of a banner or flag to such a pole clearly poses a damage threat to the pole and a safety hazard should the pole break in response to increased loading forces resulting from the banner. Manufacturing new support structures to change materials and geometries to increase pole strength is costly and will increase the cost of the support structures regardless of whether the consumer intends to use such banners. Therefore, there is a need in the art to provide a banner support assembly that may be installed on an existing support structure and not impose a high loading force thereon.

Further, there is a need to provide a support assembly that is adjustable in response to different types of wind loading conditions or banner sizes. There is a need in the art to provide support assemblies that utilize less complicated mechanisms and are attractive. Further, there is a need in the art to provide a support assembly that may repeatedly breakaway in response to high wind loading conditions and automatically return to its original position once the high wind loading condition diminishes. Further, there is a need in the art to provide a support assembly that is less expensive to manufacture and easier to use.

The present invention addresses these and other needs in the art as fully described below.

SUMMARY OF THE INVENTION

The present invention is directed to a breakaway banner support assembly comprising a mounting member connected to a support structure, a support rod extending along a generally horizontal plane for supporting a flexible banner, and a breakaway and return hinge interconnecting the support rod and the mounting member to permit the support rod to pivot between a normal display position and a breakaway position in response to a force acting thereon. The pivoting of the support rod and banner prevents the force acting thereon from transferring to the support structure or mounting member thereby preventing possible damage to the support assembly and support structure.

The breakaway and return hinge of the banner support assembly of the present invention generally comprises a spring-loaded bearing connected to the mounting member, a cam member connected to the rod at one end and having a detent therein at the opposite end wherein the cam member is pivotally connected to the mounting member, and where the spring-biased bearing engages the detent to maintain the support rod in a display position where in response to a force the cam pivots relative to the mounting member so as to disengage the spring-biased bearing from the detent to a breakaway position. The construction further permits the support rod to pivotally return to the display position when the loading force dissipates.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Figure 1A:
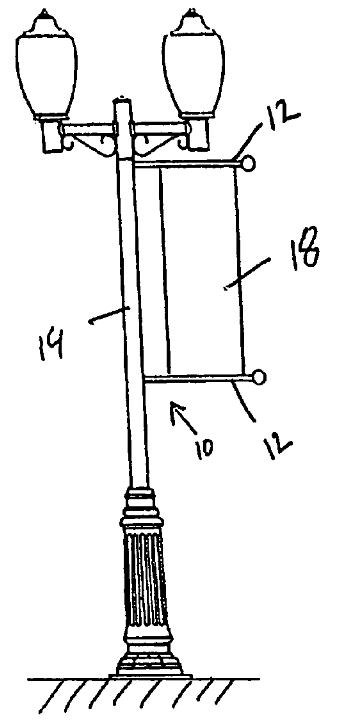
FIG. 1*a* is an elevational view of a light post having banner posts extending horizontally therefrom to support a banner.

While the present invention is described with reference to the preferred embodiment of using the invention in conjunction with an outdoor support structure such as a light post, nothing in the specification should be interpreted to limit this invention thereto.

With reference to the preferred embodiment shown in the drawings, and as best shown in FIG. 1, the banner support assembly, designated as 10, generally comprises at least one support rod 12 connected to a support structure 14, such as a light pole, and having a breakaway and return hinge 16 (shown in FIG. 2) that permits the support rod 12 to hingedly breakaway in response to an increased loading force, such as a high wind loading force acting upon the banner and support rod 12. Such a breakaway mechanism prevents the support assembly 10 from withstanding the load or transferring the load onto the support structure 14.

FIG. 1*a* shows a support structure, or in this preferred embodiment an outdoor light pole 14, having a pair of lights mounted at the upper end thereof. One method of hanging banners 18 as shown in FIG. 1 is to connect a support rod 12 to the light pole 14 where the support rod 12 extends from the light pole generally horizontally relative to the ground. The banner 18 is connected to the support rod 12 in a conventional manner and may also be supported from a lower support rod 12 also connected to the light pole. Thus, the information on the banner 18 can be easily displayed and the present design can be adjusted to accommodate banners of different sizes.

Figure 1C:
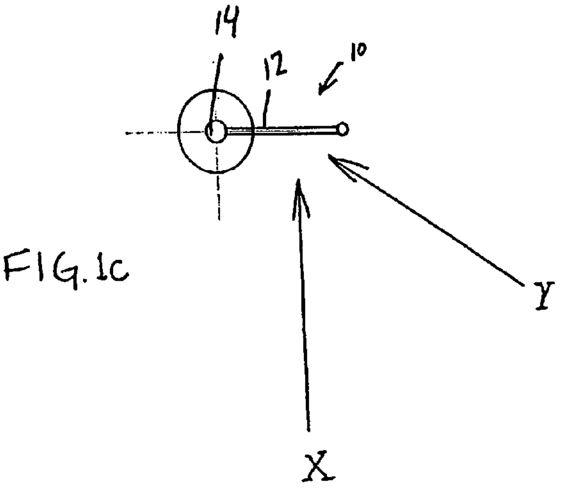
FIG. 1*c* is a view of FIG. 1*b* without the luminaries and indicating wind direction extremes X and Y.
Figure 1B:
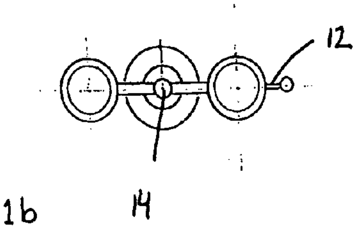
FIG. 1*b* is a top plan view of FIG. 1.

As shown in FIGS. 1*b* and 1*c*, the banner 18 is susceptible to wind forces X and Y. Wind forces X and Y can act on the banner 18 and are gathered in a sail-like manner to introduce stress on the support rod 12 and on the light pole 14. The breakaway and return hinge 16 of the present invention enables the support rod 12 to temporarily break in response to an increased load thereon, thereby releasing the gathered wind force, and return to its original display position when the load diminishes or dissipates.

Most currently available breakaway banner arms deflect under the loads imposed thereon from a wind perpendicular to the banner surface (arrow X). In this scenario, as the wind increases, a spring deflects and the banner releases, only spilling the wind off the banner surface that approached from the X direction. Unfortunately for these designs, the wind will not always come from the same direction. For example, if wind approaches the banner at 45 degrees to the banner surface as shown by Y in FIG. 1*c*, the spring will deflect allowing the banner to partially rotate and expose a larger banner surface area to the wind. Thus, the banner will prematurely release causing the banner to rotate to a position that will impose more load on the banner and into the pole. This condition could be exacerbated if the maximum allowable rotation of the breakaway hinge is 90 degrees.

Figure 2:
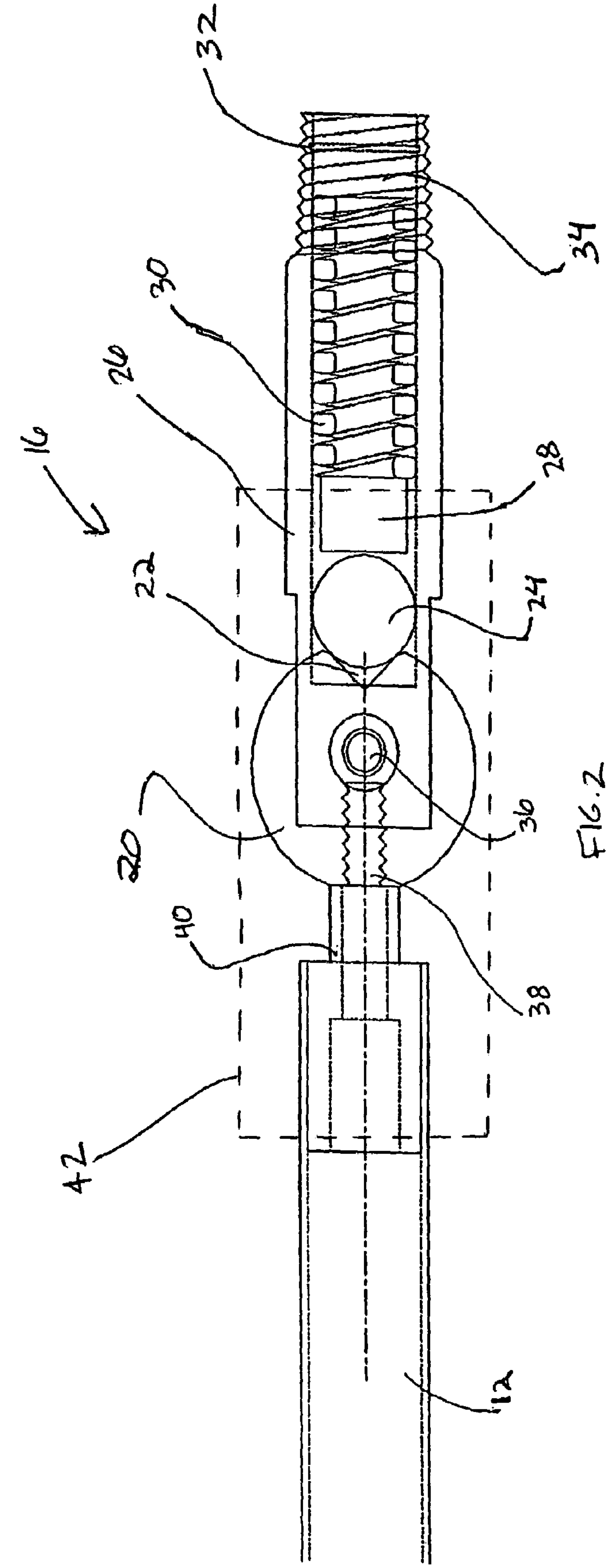
FIG. 2 is a cross-sectional top view of a banner rod having a breakaway hinge.
Figure 3:
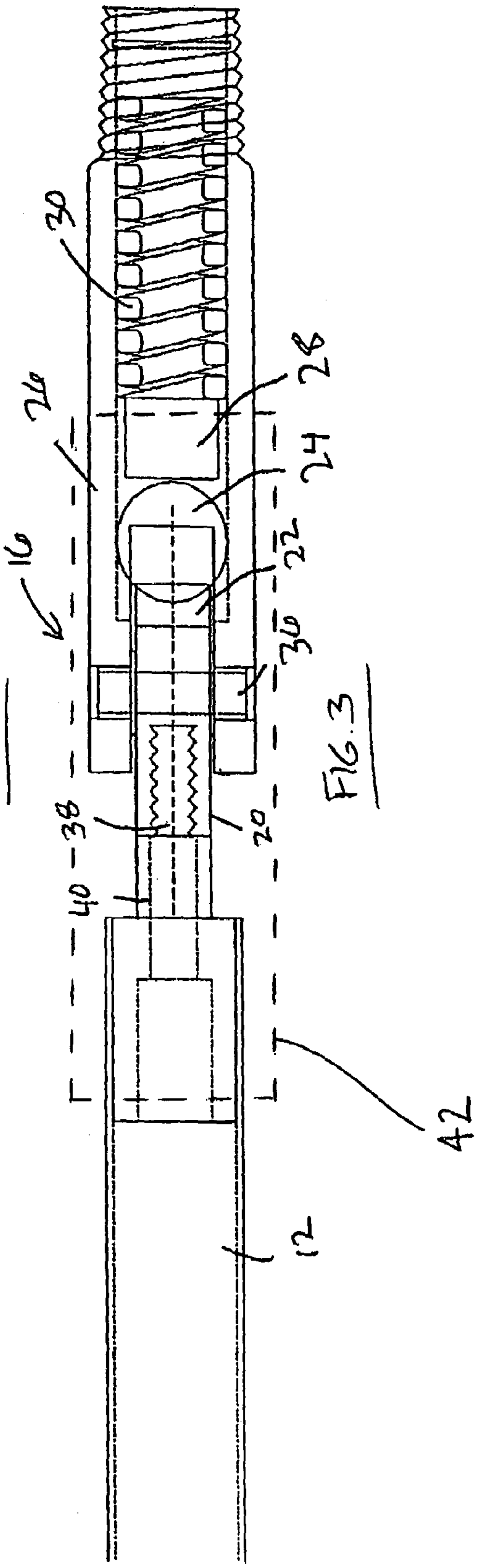
FIG. 3 is a cross-sectional side view of FIG. 2.
Figure 4:
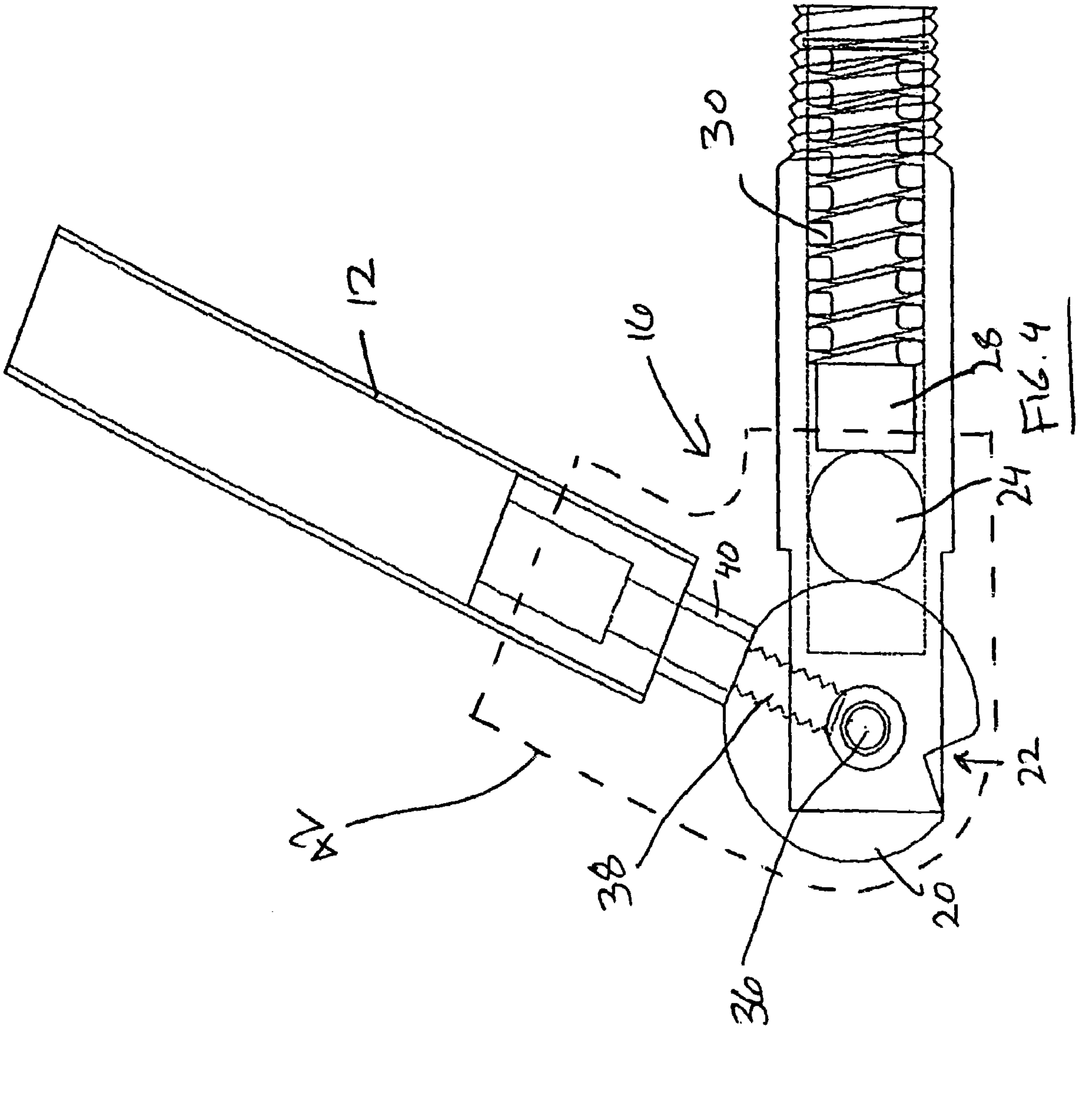
FIG. 4 is a cross-sectional top view of the banner rod having a breakaway hinge with the hinge in a breakaway position.

The breakaway and return hinge 16 of the present invention is shown in FIGS. 2 through 4. Referring to FIG. 2, the breakaway and return hinge 16 comprises a cam member 20 having a detent 22 that engages a spring-loaded bearing 24. While the detent 22 can have any conceivable shape, the present invention utilizes a V-shaped detent. Further, while the cam 20 is preferably circular, it can also be any other shape conducive to permitting breakaway and return of the support rod 12 to the display position. Regardless of the design, the breakaway and return hinge 16 should hold the support rod 12 in a stable display position wherein the breakaway and return hinge 16 can withstand a certain amount of force. However, in response to an overloading of force, the hinge collapses or disengages from its stable display position and is permitted to pivot to a breakaway position.

Mounting member 26 is connected to the support structure 14 in any conventional manner. The mounting member 26 contains a single chrome steel ball or bearing 24, a spring 30, a low friction insert 28 located between the spring 30 and the bearing 24, a retaining ring 32, and various spacers 34. Therefore, the compression load of the spring 30 may be adjusted using various spacers 34 to impart a particular force on the bearing 24.

The cam 20 is rotatably connected to the mounting member 26 by a pin 36 with the cam detent 22 engaging the spring-loaded bearing 24. The pin 36 is located some distance off the center of the cam 20 along the radial position of the detent 22 to provide a spring-back force on the support rod 12 as further explained below. The cam 20 is connected to the support rod 12 along the same radial line but opposite to the detent 22 by a bolt 38. Such a connection may also include a spacer 40 or a weld.

Prior to installation, a support rod 12 is prepared to accommodate a banner 18 of a particular size that will be mounted on a light pole 14. The pole capacity is either calculated using the AASHTO Standard specifications for Structural Supports for Highway Signs, Luminaries and Traffic Signals (AASHTO is the American Association of State Highway and Transportation Officials) or measured experimentally by actually loading a sample pole to failure. The capacity is related to a wind speed based on calculations that include the EPA (effective projected area) and the centers of pressure as well as the elevation of each component, i.e. luminaries, brackets to support luminaries, banners, and light pole, for a lighting installation. The banner mechanism is set to allow the breakaway and return hinge 16 to breakaway at a predetermined wind speed that is well below the maximum wind capacity that will cause a failure. This breakaway adjustment is achieved through any of the following procedures: selection of a spring with a desirable stiffness, setting a spring preload by installing spacer(s) to compress the spring, changing the geometry of the detent, changing the geometry of the ball, or changing the geometry of the engagement between the ball and the detent. To control the return force, any of the following actions can be utilized: change the cam shape or diameter, change the distance of the pin location, tip the pin 36 or the cam to utilize gravity assistance in returning the arm to the display position (see below for further details), or change the spring stiffness. After installation, the support rod 12 will stay in the locked, original position until the wind reaches the predetermined breakaway speed.

Thus, in operation, the mounting member 26 is mounted to a support structure 14 from which the banner 18 is to be displayed from the support rod 12. Due to the spring-loaded design of the breakaway and return hinge 16, bearing 24 is forced into engagement with the cam detent 22 so that the support rod 12 and the mounting member 26 are forced into an original display position alignment as shown in FIGS. 2 and 3. The display position is achieved by having the bearing 24 engage the detent 22 with a certain force applied by the spring 30. The adjustable force with which the bearing 24 engages the cam detent 22 determines the wind force required to move the cam 20 relative to the spring-loaded bearing 24, i.e. breakaway speed.

As the wind approaches breakaway speed, the banner 18 imposes a force on the support rod 12 that translates a force to the cam 20. The cam 20 then imposes a force against the bearing 24 through the detent edge. As that force increases, the detent edge acts on the bearing 24 and forces it against the spring 30 causing the spring to compress further. When the wind reaches the breakaway speed, and the spring 30 compresses, the detent 22 moves the bearing 24 axially out of engagement with the detent 22. The bearing 24 is forced out of the detent 22 and the cam 20 pivots about the pin 36 and out of engagement with the bearing 24. The bearing 24 stays in contact with the cam 20 due to the spring force, but the load on the entire pole drops considerably. The support rod 12 will now swing almost freely until the wind dies down.

The return force will pivot the cam 20 back to the original display position. The return force is derived from the bearing 24 pushing against the cam 20 which is in an eccentric position due to the off-center pin 36. The cam 20 will always return to the original display position as long as the return forces are larger than the friction forces resisting the motion. Therefore, the breakaway and return hinge 16 of the present invention can recover from a breakaway position shown in FIG. 4 and return to its original display position of FIGS. 2 and 3. Further, because the cam 20 is in an eccentric position due to the off-center pin 36, the support rod 12 is permitted to pivot about the mounting member 26, as shown in FIG. 4, to a position considerably further than 90 degrees from the original display position. Thus, the added pivotal extent of the support rod 12 allows the banner 18 an increased opportunity to deflect or spill off a high wind force.

Further, the active components of the breakaway hinge, other than the cam 20, are hidden inside the mounting member 26 or alternatively hidden inside the support arm 12. Thus, the present invention enables the banner supporting assembly to be attractive as well as functional. Further, this construction protects the spring 30 and bearing 24 from the elements so that the hinge is less susceptible to locking up from ice, corrosion, or debris. Further, this design permits the spring 30 and bearing 24 to be "packed" with lubrication to further reduce friction if desired. Thus, actuating the hinge will also relubricate the system.

The breakaway force should be set so that a banner of a certain EPA (effective projected area) will release when the wind reaches a predetermined speed. If the breakaway force is set too low, slower wind speeds will impart large enough forces to cause the cam detent 20 to overcome the bearing force and allow the banner to swing freely. Conversely, if the breakaway force is set to high, too much load from high winds can damage the pole before the cam detent 20 can overcome the bearing force. Therefore, several adjustments can be made to influence the breakaway force as determined by the depth of the detent 20, the stiffness of the spring, eccentricity of the cam, and the preload on the spring. Thus, the current design can be used for different applications since the preload and or the spring stiffness can easily be changed or adjusted.

As indicated above, the present invention can be modified by tilting the pin 36 off of a vertical axis so that the end of the support rod 12 is at its lowest vertical position at the display position and achieves a higher vertical position upon pivoting to either side of the display position. Such a modification would permit gravity to assist in returning the support rod 12 to its display position after breakaway. Further, a flexible sleeve, such as a rubber sleeve, can be placed over the breakaway and return hinge 16 of the breakaway support assembly to protect against environmental factors that could impede or harm the operation of the breakaway and return hinge 16, such as water, dirt, ice, etc., while still permitting the hinge to pivot during operation.

While the invention has been described with reference to the preferred embodiment of utilizing the invention with an outside light pole, other embodiments, modifications, and alternations that occur to one skilled in the art upon reading and understanding of this specification are covered to the extent that they fall within the scope of the appended claims.

Having thus described the invention, we claim:

1. A breakaway banner support assembly for mounting to a support structure, said banner support assembly comprising:

a mounting member adapted to be connected to said support structure;

a support rod extending along a generally horizontal plane capable of supporting a flexible banner; and a breakaway and return hinge interconnecting said support rod and said mounting member, said rod pivotally movable along said generally horizontal plane between a stable display position and a breakaway position on each side of said display position, each said breakaway position permitting pivotal movement of said support rod to rotate to at least 45 degrees from said display position, wherein response to an overloading force acting upon said support rod, said hinge breaks away from said stable display position permitting said support rod to pivot to one of said breakaway positions to deflect said force, and wherein said hinge pivotally forces said rod to return to said display position when said force dissipates.

2. The banner support assembly of claim 1 wherein pivoting of said rod prevents said force from transferring excessive load onto said support structure or mounting member.

3. The banner support assembly of claim 2 wherein said force is a wind force acting upon said banner.

4. The banner support assembly of claim 3 wherein said breakaway and return hinge comprises:

a spring-loaded bearing connected to said mounting member;

a generally circular cam member connected to said rod at one end and having a detent therein at the opposite end, said cam member pivotally connected to said mounting member; and wherein said spring-biased bearing engages said detent to maintain said rod in said display position and where in response to said force said cam pivots relative to said mounting member so as to disengage said spring-biased bearing from said detent to a breakaway position.

5. The banner support assembly of claim 4 wherein said cam member is pivotally connected to said mounting member along an axis offset from the center of said cam member so that the increased force of said spring-biased bearing on said cam member when said bearing is disengaged from said detent during breakaway causes said rod to return to said display position.

6. The banner support assembly of claim 5 wherein a compression load of said spring-biased bearing may be adjusted to impart a particular force on said bearing so as to vary the force at which said rod will pivot to said breakaway position.

7. The banner support assembly of claim 6 wherein said detent is V-shaped.

8. The banner support assembly of claim 7 wherein said support structure is a pole.

9. The banner support assembly of claim 7 wherein said support structure is a wall.

10. The banner support assembly of claim 1 wherein said support rod extends along a plane slightly offset from a horizontal plane so as to permit gravity to assist the banner rod in pivotally returning to said stable display position.

11. The banner support assembly of claim 1 further comprising a flexible sleeve covering said hinge so as to permit pivotal movement of said support rod while preventing water or debris from entering said hinge.

12. A breakaway banner support assembly for mounting to a support structure, said banner support assembly comprising:

a pair of mounting members adapted to be connected to said support structure and spaced from each other along a generally vertical plane;

a pair of support rods extending along respective generally horizontal planes capable of supporting a flexible banner therebetween; and a break away and return hinge interconnecting said support rods and said mounting members, said hinge comprising:

a spring-loaded bearing connected to said mounting member;

a cam member connected to said rod at one end and having a detent therein at the opposite end, said cam member pivotally connected to said mounting member; and wherein said spring-loaded bearing engages said detent to maintain said rod in a stable display position and, in response to an overloading force acting upon said rod, said cam member pivots relative to said mounting member wherein said spring-biased bearing is disengaged from said detent and said rod is capable of pivoting to a breakaway position on either side of said display position to at least 45 degrees from said display position, so as to deflect said force acting upon said rod and wherein said bearing engages said cam member to pivotally return said rod to said display position when said force dissipates.

13. The banner support assembly of claim 12 wherein pivoting of said rods prevents said force from transferring excessive load onto the support structure or mounting members.

14. The banner support assembly of claim 13 wherein said force is a wind force acting upon said banner.

15. The banner support assembly of claim 14 wherein said cam member is pivotally connected to said mounting member along an axis offset from the center of said cam member so that the increased force of said spring-biased bearing on said cam member during pivoting to said breakaway position causes said rod to return to said display position.

16. The banner support assembly of claim 15 wherein said cam member is generally circular.

17. The banner support assembly of claim 16 wherein the compression load of said spring-biased bearing may be adjusted to impart a particular force on said bearing so as to increase the force at which said rod will pivot to said breakaway position.

18. The banner support assembly of claim 17 wherein said detent is V-shaped.

19. The banner support assembly of claim 18 wherein said support structure is a pole.

20. The banner support assembly of claim 18 wherein said support structure is a wall.

21. A breakaway banner support assembly for mounting to a support structure, said banner support assembly comprising:

a mounting member adapted to be connected to said support structure;

a support rod extending along a generally horizontal plane;

a banner supported by said support rod; and a break away and return hinge interconnecting said support rod and said mounting member, said rod pivotally movable along said generally horizontal plane between a stable display position and a breakaway position, where in response to an overloading force acting upon said support rod, said hinge breaks away from said stable display position permitting said support rod to pivot to said breakaway position to deflect said force, and wherein said hinge independently forces said rod to pivotally return to said display position when said force dissipates.

22. The breakaway banner support assembly of claim 21 wherein said support rod can pivot to a breakaway position on either side of said display position and rotate to at least 45 degrees from said display position.

23. The breakaway banner support assembly of claim 22 wherein support rod can pivot to a breakaway position on either side of said display position and rotate to at least 90 degrees from said display position.

* * * * *